(12) United States Patent
Ranchin

(10) Patent No.: US 6,807,852 B2
(45) Date of Patent: Oct. 26, 2004

(54) TEST BENCH FOR TESTING A POWER TRANSMISSION DEVICE AND A TEST SYSTEM COMPRISING SUCH A TEST BENCH PROVIDED WITH A POWER TRANSMISSION DEVICE

(75) Inventor: Michel Ranchin, Lancon-de-Provence (FR)

(73) Assignee: Eurocopter, Marignane Cedex (FR)

( * ) Notice: Subject to any disclaimer, the term of this patent is extended or adjusted under 35 U.S.C. 154(b) by 58 days.

(21) Appl. No.: 10/279,030

(22) Filed: Oct. 24, 2002

(65) Prior Publication Data

US 2003/0079531 A1 May 1, 2003

(30) Foreign Application Priority Data

Oct. 29, 2001 (FR) .............................................. 01 13958

(51) Int. Cl.[7] .............................................. G01M 13/02
(52) U.S. Cl. ..................................................... 73/118.1
(58) Field of Search ........................ 73/112, 116, 117.2, 73/117.3, 118.1, 119 R

(56) References Cited

U.S. PATENT DOCUMENTS

| | | | | |
|---|---|---|---|---|
| 4,159,642 A | * | 7/1979 | Hudson et al. ............. | 73/118.1 |
| 5,142,903 A | * | 9/1992 | Mizushina et al. ......... | 73/118.1 |
| 5,189,908 A | * | 3/1993 | Sano et al. ................. | 73/118.1 |
| 5,363,317 A | * | 11/1994 | Rice et al. .................... | 702/34 |
| 5,537,865 A | * | 7/1996 | Shultz ....................... | 73/118.1 |
| 6,047,596 A | * | 4/2000 | Krug et al. .................... | 73/162 |
| 6,155,948 A | * | 12/2000 | Gierer .......................... | 475/123 |
| 6,343,504 B1 | * | 2/2002 | Shultz ......................... | 73/118.1 |
| 6,393,904 B1 | * | 5/2002 | Krug et al. ................. | 73/118.1 |
| 6,507,789 B1 | * | 1/2003 | Reddy et al. .................. | 702/34 |
| 2003/0107384 A1 | * | 6/2003 | Ranchin et al. ............. | 324/555 |

FOREIGN PATENT DOCUMENTS

| | | |
|---|---|---|
| DE | 7812143 | 8/1978 |
| DE | 19616729 | 10/1997 |
| WO | 9960362 | 11/1999 |

OTHER PUBLICATIONS

Preliminary Search Report dated Sep. 12, 2002 with English Translation. FR 0113958.

* cited by examiner

*Primary Examiner*—Eric S. McCall
(74) *Attorney, Agent, or Firm*—Stevens, Davis, Miller & Mosher, LLP

(57) ABSTRACT

A test bench for testing a power transmission device may include, a first assembly that can be connected to an output shaft of the power transmission device to be tested, a second assembly that can be connected to an input shaft of the power transmission device, and a transmission shaft that connects the first and second assemblies together. The second assembly includes a subassembly having a first module that is adjustable in position and orientation and able to be connected to the input shaft of the power transmission device. Additionally, the second assembly includes a second module that is coupled with the first module and provides a kinematic adaptation between the first module and the power transmission device.

8 Claims, 2 Drawing Sheets

TEST BENCH FOR TESTING A POWER TRANSMISSION DEVICE AND A TEST SYSTEM COMPRISING SUCH A TEST BENCH PROVIDED WITH A POWER TRANSMISSION DEVICE

BACKGROUND OF THE INVENTION

The present invention relates to a test bench for testing a power transmission device, and to a test system comprising such a test bench provided with a power transmission device.

Although not exclusively, said test bench is more particularly intended for testing a transmission gearbox (main, intermediate or tail rotor) of a helicopter.

DESCRIPTION OF THE RELATED ART

It is known that a test bench is generally used for carrying out two types of tests, that is to say:

- development tests, the purpose of which is to simulate as closely as possible the real operating conditions (in particular the simulation of the rotor head loading pattern and the levels of load for a main transmission gearbox of a helicopter) of the power transmission device; and
- acceptance tests, the purpose of which is to check the correct functioning of various mechanical components, subjected to a standard load spectrum (with measurements of torque, speeds of rotation and temperatures in particular).

In general, such a test bench, in order to test a power transmission device comprising at least one input shaft (for example an engine drive shaft or a power distribution shaft), an output shaft (for example a rotor shaft), and a casing, comprises:

- a first assembly which is able to be connected to the output shaft of the power transmission device to be tested;
- a second assembly which is able to be connected to the input shaft of the power transmission device to be tested and which is adapted, geometrically and kinematically, to said power transmission device; and
- at least one transmission shaft connecting said first and second assemblies together.

Said second assembly is chosen according to the geometric and kinematic characteristics of the power transmission gearbox to be tested, in such a way as to provide:

- on the one hand, a geometric adaptation with respect to said power transmission gearbox and in particular with respect to said input shaft or shafts, in such a way as to make it possible, in particular, to move said input shafts according to their usual degrees of freedom; and
- on the other hand, a kinematic adaptation, to allow adequate functioning of the kinematic system formed by said test bench and the power transmission device mounted on the latter.

Consequently, when the type of power transmission device to be tested is changed, it is necessary to replace, on said test bench, said second assembly with a second assembly that is adapted (geometrically and kinematically) to the new power transmission device to be tested. Now, such a replacement operation is long and requires complex and costly tooling.

Furthermore, said second assemblies are very costly both to purchase and to maintain, in particular because they are generally manufactured as one-off items.

Furthermore, because of the diversity of existing power transmission gearboxes, it is necessary to provide a large number of such (different) second assemblies in order to satisfy the various possible demands for tests on one and the same test bench.

SUMMARY OF THE INVENTION

The present invention relates to a test bench making it possible to overcome these disadvantages.

For this purpose, according to the invention, said test bench for testing a power transmission device, in particular a transmission gearbox of a helicopter, comprising at least one input shaft, one output shaft and a casing, said test bench comprising:

- a first assembly which is able to be connected to the output shaft of the power transmission device to be tested;
- a second assembly which is able to be connected to the input shaft of the power transmission device to be tested and which is adapted, geometrically and kinematically, to said power transmission device; and
- at least one transmission shaft connecting said first and second assemblies together, is noteworthy in that said second assembly comprises at least one subassembly comprising:
- a first module provided with a mechanical unit that comprises gearing elements, which is adjustable in position and in orientation, and which is able to be connected to said input shaft of the power transmission device to be tested; and
- a second module which is coupled with said first module and which makes it possible to provide a kinematic adaptation between said first module and said power transmission device to be tested.

Thus, by means of the invention, when the type of power transmission device to be tested is changed, it suffices:

- to adjust said first module (of said second assembly) in position and in orientation in such away as to carry out the required geometric adaptation to make it possible to carry out the tests; and
- to replace, simply and solely, said second module (of said second assembly), which is inexpensive and easy to replace (as described below), with a new second module which makes it possible to carry out the required appropriate kinematic adaptation.

Consequently, due to the invention, it is not necessary in this case to replace the whole of said second assembly, which makes it possible to overcome the aforementioned disadvantages.

Preferably, said second module comprises gearing having a reduction ratio which is adapted to that of the power transmission gearbox in order to obtain an overall ratio substantially equal to unity. Such gearing, of usual type, is of course inexpensive and easy to manufacture.

It is however not strictly necessary to obtain an overall ratio of 1/1. In fact, the torque-applying device of the bench is generally hydraulic and allows a certain sliding of the mechanical devices to which it applies the torque.

In a first embodiment, said second module is mechanically independent from said first module. It is then preferably produced in such a way as to serve as an interface between said first module and the input shaft of the power transmission device.

In a second embodiment, said second module is mounted, in a detachable manner, on said first module. In this case, said second module is uniquely connected to said first module (and no longer to the input shaft), which simplifies and facilitates the replacement of said second module.

Furthermore, advantageously, said first module comprises gearing elements making it possible to subject said mechanical unit:

to two rotations respectively about a vertical direction and about a horizontal direction located in a vertical plane which is transverse to the direction defined by the input shaft of the power transmission device to be tested; and to a movement of translation along said horizontal direction of said vertical plane.

In general, the power transmission device comprises a plurality of n input shafts (for example one or more engine drive shafts and/or one or more power distribution shafts). In this case, advantageously, in order to be able to test this power transmission device, said second assembly comprises n subassemblies able to be coupled respectively to said n input shafts (n being greater than or equal to 2).

The present invention also relates to a test system comprising:

a test bench for testing a power transmission device, in particular a transmission gearbox of a helicopter; and a power transmission device which comprises at least one input shaft, one output shaft and a casing and which is mounted on said test bench.

This system is noteworthy, according to the invention in that it comprises the aforementioned test bench.

When it is independent from the first module, said second module is preferably mounted on a detachable support also carrying the casing of the power transmission gearbox, which makes it possible to form a unit assembly (mechanically integrated support, second module and power transmission device) which can be easily removed and transported, in particular during a replacement.

The figures of the appended drawing will give a good understanding of how the invention can be embodied. In these figures, identical references denote similar elements.

DETAILED DESCRIPTION OF THE INVENTION

Figure 1:
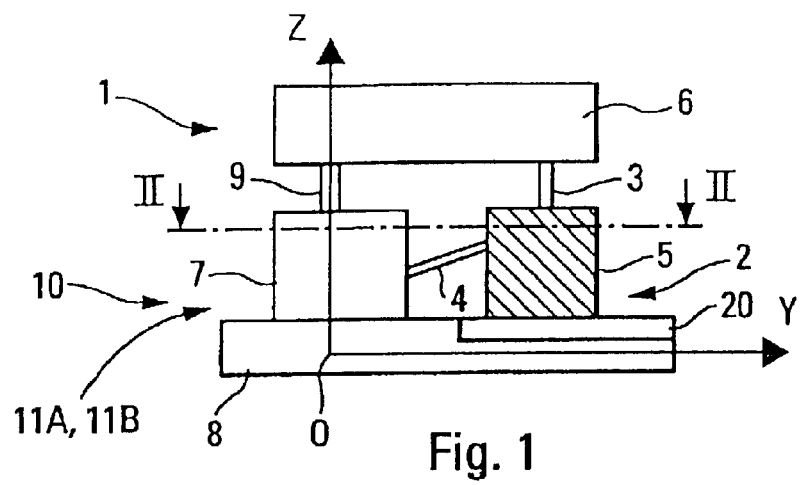
FIG. 1 is the block diagram of a test system according to the invention.
Figure 2:
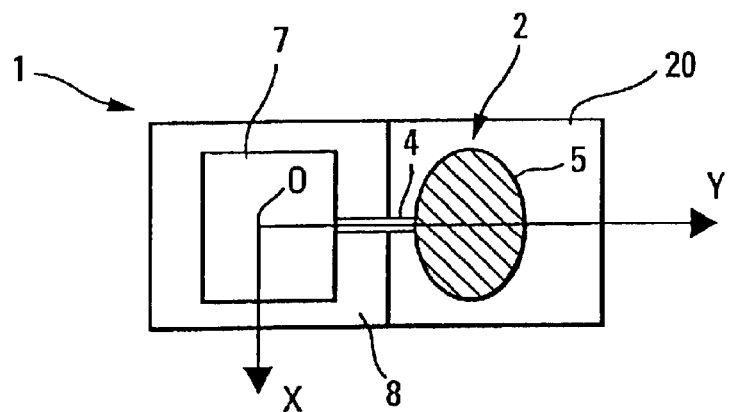
FIG. 2 is a diagrammatic view through the line II—II of FIG. 1.

The test bench 1 according to the invention and shown diagrammatically in FIGS. 1 and 2 is used for testing a power transmission device 2, in particular a transmission gearbox (main, intermediate or tail rotor) of a helicopter.

Within the framework of the present invention, a power transmission device 2 comprises, in particular and in a normal way:

at least one output shaft 3 (a rotor shaft for example) which is subjected to a loading pattern of six forces and moments;

at least one input shaft 4 [power drive shaft or power distribution (power transmission) shaft for example]; and a casing 5 which is capable of absorbing all of the forces within a fixed frame of reference.

It is known that, in order to test such a power transmission device 2, the test bench 1 generally carries out two types of tests, namely:

development tests, the purpose of which is to simulate as closely as possible the real operating conditions (in particular the simulation of the rotor head loading pattern and the levels of load for a main transmission gearbox of a helicopter) of the power transmission device 2; and acceptance tests, the purpose of which is to check the correct functioning of various mechanical components, subjected to a standard load spectrum (with measurements of torque, speeds of rotation and temperatures in particular).

For this purpose said test bench 1, which forms in itself an open kinematic system (of mechanical, hydraulic or electrical type), comprises in a known way, as represented diagrammatically in FIG. 1:

a first assembly 6 which is able to be connected, by the intermediary of normal means that are not shown, to the output shaft 3 of the power transmission device 2 to be tested;

a second assembly 7 which is mounted on a support element 8 forming a horizontal plane OXY and which is able to be connected, by the intermediary of normal means that are not shown, to the input shaft 4 of the power transmission device 2 to be tested and which is adapted, both geometrically and kinematically, to said power transmission device 2; and at least one transmission shaft 9, of vertical axis OZ, connecting together said first and second assemblies 6 and 7.

Said test bench 1 and the power transmission device 2 mounted on the latter form a test system 10 which constitutes a closed kinematic system such that, during a test, the energy that is delivered by the output shaft 3 is reinserted in the input shaft 4 of the power transmission device 2, via the assembly 6, the transmission shaft 9 and the assembly 7. This closed system (or this test system 10) therefore consumes very little energy. Only the energy losses are in fact consumed.

The simulation carried out by the test bench 1 during a test consists in recreating the various stresses by mechanical, hydraulic or electrical techniques, without necessarily supplying the totality of the power.

In particular, for transmission gearboxes (main, intermediate and tail rotor) of a helicopter, there is principally simulation of:

the drive torques and the rotor torques;

the speed ranges;

the aerodynamic forces of the rotor 3 (thrust, flexion);

the forces absorbed by the casing 5; and the drive forces of accessories (pumps, alternator, fan, etc).

According to the invention, said second assembly 7 comprises at least one subassembly 11A, 11B comprising:

a first module 12A, 12B provided with a mechanical unit 13A, 13B which is adjustable in position and in orientation as described below and which is able to be connected to said input shaft 4 of the power transmission device 2 to be tested; and a second module 14A, 14B which is coupled to the first module 12A, 12B and which makes it possible to provide a kinematic adaptation between said first module 12A, 12B and said power transmission device 2 to be tested.

Thus, because of the invention, when the power transmission device 2 to be tested is changed and it is replaced by a different device 2 (that is to say of another type), it simply suffices:

to adjust the position and orientation of said first module 12A, 12B (of said second assembly 7) in such a way as to carry out the geometric adaptation required in order to be able to carry out the tests; and to replace solely said second module 14A, 14B (of said second assembly 7), which is inexpensive and easy to replace (as described below), by a second module which makes it possible to carry out the required appropriate kinematic adaptation.

Consequently, due to the invention, it is not necessary in this case, unlike the usual solution, to replace the whole of said second assembly 7 and this offers numerous advantages, in particular:

simpler and faster replacement; and lower cost, since only the second module 14A, 14B must be available in a plurality of different variants, respectively adapted to the various types of power transmission device 2 to be tested.

Thus, because of the invention, said second assembly 7 is capable of providing:

on the one hand, a geometric adaptation with respect to the power transmission gearbox 2 and in particular with respect to said input shaft or shafts 4, making it possible, in particular, to move said input shaft or shafts 4 according to its or their usual degrees of freedom; and on the other hand, a kinematic adaptation allowing a suitable functioning of the kinematic system 10 (formed by said test bench 1 and the power transmission device 2 mounted on the latter).

Figure 3:
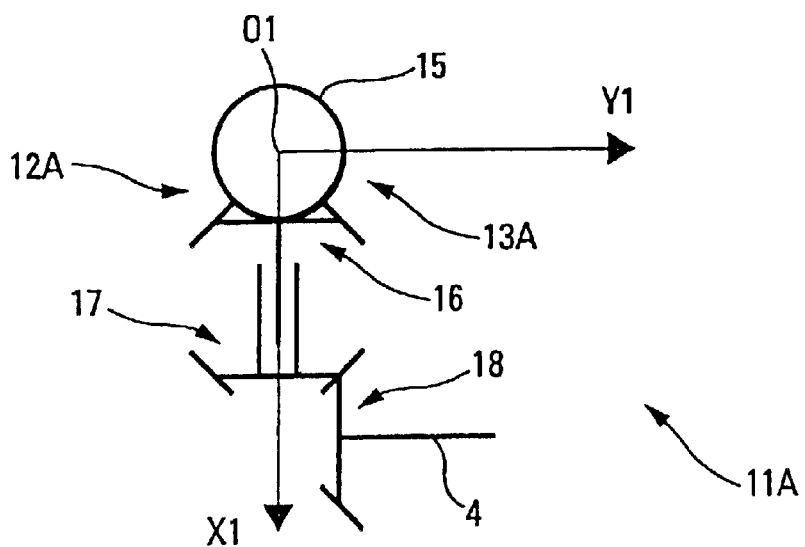
FIG. 3 is a diagrammatic illustration of a particular embodiment of a first module of a test bench according to the invention.
Figure 4:
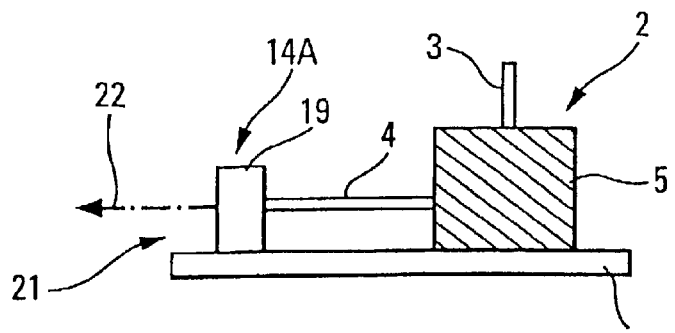
FIG. 4 is a diagrammatic illustration of a particular embodiment of a second module of a test bench according to the invention.

In a first embodiment, said second assembly 7 comprises a subassembly 11A comprising a first module 12A, shown in FIG. 3, and a second module 14A, shown in FIG. 4, which are mechanically independent from each other.

Said first module 12A comprises a mechanical unit 13A which comprises:

a wheel 15 which is engaged, in a usual manner, with the transmission shaft 9;

a mechanical element 16 which is linked to said wheel 15;

a mechanical element 17 which cooperates with the mechanical element 16 in such a way as to allow a translation along an axis O1X1 (parallel with the axis OX and passing through the centre O1 of the wheel 15); and a pinion 18 which is engaged both with said mechanical element 17 and with the input shaft 4 of the power transmission device 2.

Thus, because of the preceding characteristics, the mechanical unit 13A can be subjected to:

a rotation about a vertical axis O1Z1, which is not shown (which is perpendicular to the horizontal plane O1X1Y1 and parallel with OZ), due to the rotation of the assembly of elements 16, 17 and 18 with respect to the element 15 about the axis O1Z1;

a rotation about the axis O1X1, due to the rotation of the element 18 with respect to the assembly of elements 15, 16 and 17 about the axis O1X1; and a translation along the axis O1X1, due to the translation of the assembly of elements 17 and 18 with respect to the assembly of elements 15 and 16.

Consequently, the input shaft 4 can move according to its various degrees of freedom, corresponding in the usual way respectively to a rotation about the axis OZ, a rotation about the axis OX and a translation along the axis OX.

Furthermore, said second module 14A comprises a gearing 19, shown diagrammatically in FIG. 4, having a reduction ratio that is adapted to that of the power transmission gearbox 2 in order to obtain an overall ratio allowing the correct functioning of the system 10 (kinematic system).

In the embodiment shown in FIG. 4, said second module 14A is mounted on a support 20 upon which is also fixed the casing 5 of the power transmission device 2 in such a way as to form a unit assembly 21 which can be easily moved and transported, in particular in view of a mounting on the test bench 1. This unit assembly 21 can be mounted, in a detachable manner, on the support element 8 of the test bench 1.

In this case, said second module 14A serves, preferably, as an interface between the input shaft 4 and the first module 12A (as illustrated by a dotted and dashed link 22).

Consequently, when changing the power transmission device 2 to be tested, said unit assembly 21, which is shown in FIG. 4, is simply replaced by a new unit assembly 21 comprising the new power transmission device 2 to be tested and the new module 14A providing the kinematic adaptation of the test bench 1 to this new power transmission device 2.

Figure 5:
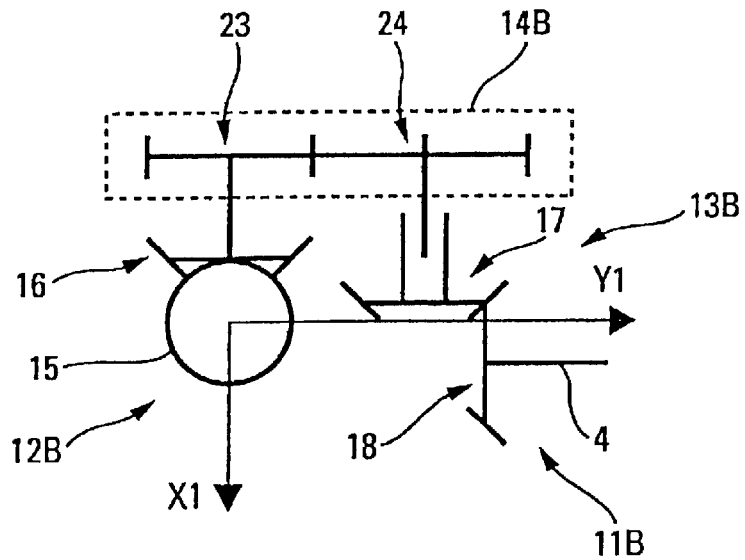
FIG. 5 is a diagrammatic illustration of a particular embodiment of a second assembly comprising a first module and a second module.

Furthermore, in a second embodiment 11B shown in FIG. 5, said second module 14B is mounted, in a detachable manner, on said first module 12B.

This embodiment comprises the same elements 15 to 18 as those in FIG. 3, which furthermore carry out the same functions and therefore make it possible for said subassembly 11B to also carry out the abovementioned movements (rotations about O1X1 and O1Z1 and translation along O1X1).

Furthermore, said second module 14B comprises meshed elements 23 and 24, of usual type, engaged with each other and making it possible to produce the aforementioned appropriate reduction ratio, depending on the power transmission device 2 to be tested.

Consequently, when the type of power transmission device 2 is changed, said second module 14B is simply and solely replaced by an appropriate second module. The replacement is simplified in comparison with the aforementioned embodiment 11A shown in FIGS. 3 and 4, since said second module 14B does not serve as an interface between the first module 12B and the input shaft 4 of the power transmission device 2.

Figure 6:
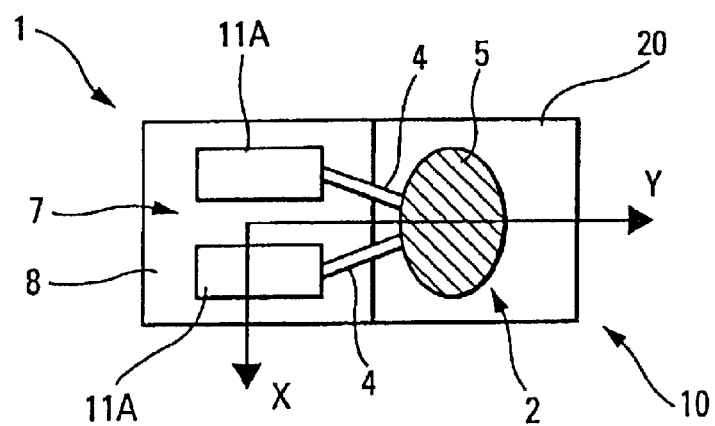
FIG. 6 is a diagrammatic view similar to that of FIG. 2 for a power transmission device comprising two input shafts.

In general, the power transmission device 2 comprises a plurality of n input shafts 4 (for example one or more engine drive shafts and/or one or more power distribution shafts), in particular two shafts 4 as in the embodiment shown in FIG. 6. In this case, in order to be able to test this power transmission device 2, said second assembly 7 comprises n subassemblies 11A or 11B able to be respectively coupled with said n input shafts 4 (n being greater than or equal to 2).

According to the invention, said second assembly 7 can therefore comprise:

solely subassemblies 11A, as shown in FIG. 6, or solely subassemblies 11B; or a combination of subassemblies 11A and 11B.

What is claimed is:

1. A test bench for testing a power transmission device of a transmission gearbox of a helicopter, said power transmission device comprising at least one input shaft, one output shaft, and a casing and said test bench comprising:

a first assembly for being connected to the output shaft of the power transmission device to be tested;

a second assembly for being connected to the input shaft of the power transmission device to be tested and which is adapted, geometrically and kinematically, to said power transmission device; and at least one transmission shaft connecting said first and second assemblies together, wherein said second assembly comprises at least one subassembly comprising:

a first module provided with a mechanical unit that comprises gearing elements, which mechanical unit is adjustable in position and in orientation, and which is for being connected to said input shaft of the power transmission device to be tested; and a second module which is coupled with said first module and which makes it possible to provide a kinematic adaptation between said first module and said power transmission device to be tested.

2. The test bench as claimed in claim 1, wherein said second module comprises gearing having a reduction ratio which is adapted to that of the power transmission gearbox in order to obtain an overall ratio substantially equal to unity.

3. The test bench as claimed in claim 1, wherein said second module is mechanically independent from said first module.

4. The test bench as claimed in claim 1, wherein said second module is mounted in a detachable manner on said first module.

5. The test bench as claimed in claim 1, wherein said gearing elements make it possible to subject said mechanical unit:

to two rotations respectively about a vertical direction and about a horizontal direction located in a vertical plane which is transverse to the direction defined by the input shaft of the power transmission device to be tested; and to a movement of translation along said horizontal direction of said vertical plane.

6. The test bench as claimed in claim 1 comprising a plurality n of input shafts, n being an integer greater than or equal to 2, and said second assembly comprises n subassemblies for being coupled respectively to said n input shafts.

7. A test system comprising:

a test bench as defined by claim 1 for testing a power transmission device of a transmission gearbox of a helicopter, wherein:

said power transmission device comprises at least one input shaft, one output shaft and a casing and is mounted on said test bench.

8. The test system as claimed in claim 7, wherein said second module is mechanically independent from said first module and said second module is mounted on a detachable support, also carrying the casing of said power transmission gearbox.

* * * * *